United States Patent
Jayachandran et al.

(10) Patent No.: US 12,472,895 B2
(45) Date of Patent: Nov. 18, 2025

(54) ENERGY ABSORBING REINFORCEMENT STRUCTURE FOR A VEHICLE

(71) Applicant: Ford Global Technologies, LLC, Dearborn, MI (US)

(72) Inventors: Raj Jayachandran, Canton, MI (US); Fnu Mir Hamed Umar, Farmington Hills, MI (US); John Mardeusz, Dearborn, MI (US); Irfan Sharif, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 762 days.

(21) Appl. No.: 17/742,790

(22) Filed: May 12, 2022

(65) Prior Publication Data
US 2023/0365084 A1 Nov. 16, 2023

(51) Int. Cl.
*B60R 19/18* (2006.01)
*B60R 19/24* (2006.01)

(52) U.S. Cl.
CPC .............. *B60R 19/18* (2013.01); *B60R 19/24* (2013.01); *B60R 2019/1866* (2013.01)

(58) Field of Classification Search
CPC ......... B60R 19/14; B60R 19/44; B60R 19/54; B60R 19/18; B60R 19/24; B60R 2019/1866; B60R 2019/188; B60R 2019/1886; B60R 2021/0006; B60R 2021/0051; B60R 2021/0053; B60R 13/04
See application file for complete search history.

(56) References Cited

U.S. PATENT DOCUMENTS

| | | | |
|---|---|---|---|
| 3,995,901 A * | 12/1976 | Filbert, Jr. | B60R 19/18 267/140 |
| 6,290,272 B1 * | 9/2001 | Braun | B60R 19/18 293/133 |
| 8,157,278 B2 * | 4/2012 | Buck | B60R 3/00 280/166 |
| 8,313,129 B2 | 11/2012 | Schuler et al. | |
| 8,684,427 B2 | 4/2014 | Marur et al. | |
| 9,033,399 B2 | 5/2015 | Marur et al. | |
| 10,000,171 B2 * | 6/2018 | Pingston | B60R 19/44 |
| 10,065,587 B2 | 9/2018 | Martini et al. | |
| 10,618,485 B2 * | 4/2020 | Farooq | B60R 19/18 |

(Continued)

FOREIGN PATENT DOCUMENTS

| | | | | |
|---|---|---|---|---|
| FR | 2883238 A1 * | 9/2006 | | B60R 19/12 |
| FR | 3032406 A1 * | 8/2016 | | B60R 19/18 |
| WO | 2013082261 | 6/2013 | | |

OTHER PUBLICATIONS

Computer translation of FR 3032406 (Year: 2016).*

*Primary Examiner* — Gregory A Blankenship
(74) *Attorney, Agent, or Firm* — Burris Law, PLLC

(57) ABSTRACT

A structure for a vehicle includes a body and an energy absorber assembly. The body extends in a transverse direction of the vehicle and is configured to be secured to a main body structure of the vehicle. The energy absorber assembly extends from the body. The energy absorber assembly also includes arcuate absorber elements configured to deform laterally upon impact in a longitudinal direction of the vehicle. When a vertical force is applied to the structure, the body is configured to inhibit deflection of the structure in a vertical direction.

20 Claims, 8 Drawing Sheets

(56) References Cited

U.S. PATENT DOCUMENTS

| | | | |
|---|---|---|---|
| 2009/0066119 A1* | 3/2009 | Woods | B60R 19/18 |
| | | | 293/142 |
| 2010/0084879 A1* | 4/2010 | Stadtherr | B60R 19/24 |
| | | | 293/155 |
| 2014/0312636 A1* | 10/2014 | Corwin | B60R 19/34 |
| | | | 293/133 |
| 2015/0192183 A1* | 7/2015 | Subramanian Muthu | |
| | | | B60R 19/26 |
| | | | 267/141 |
| 2016/0280164 A1* | 9/2016 | Hammer | B60R 19/18 |
| 2017/0334381 A1* | 11/2017 | Cheng | B60R 19/023 |
| 2017/0355332 A1* | 12/2017 | Pingston | B60R 19/44 |
| 2019/0263342 A1* | 8/2019 | Rodgers | B60R 19/18 |
| 2021/0053522 A1* | 2/2021 | Whitehead | B60R 19/54 |
| 2023/0365084 A1* | 11/2023 | Jayachandran | B60R 19/18 |
| 2024/0017692 A1* | 1/2024 | Akif | B60R 21/0136 |
| 2024/0317166 A1* | 9/2024 | Kim | B60R 19/18 |

* cited by examiner

ENERGY ABSORBING REINFORCEMENT STRUCTURE FOR A VEHICLE

FIELD

The present disclosure relates to an energy absorbing reinforcement structure for a vehicle, and a vehicle including an energy absorbing reinforcement structure.

BACKGROUND

The statements in this section merely provide background information related to the present disclosure and may not constitute prior art.

Energy absorbing structures are provided in many areas in a motor vehicle body to protect structures that are arranged behind the energy absorbers, for example. Such energy absorbing structures are typically in the area of the vehicle bumper systems where, for example, energy absorbing elements or structures are integrated into the space between bumper fascia and bumper cross beam. By absorbing energy during an impact such as a low speed impact, the energy absorbing structure may reduce damage to other parts of the vehicle.

These issues related to energy absorbing structures in vehicles, among other issues related to energy absorbing structures, are addressed by the present disclosure.

SUMMARY

This section provides a general summary of the disclosure and is not a comprehensive disclosure of its full scope or all of its features.

In one form, the present disclosure provides a structure for a vehicle that includes an energy absorber body and an energy absorber assembly. The energy absorber body extends in a transverse direction of the vehicle and is configured to be secured to a main body structure of the vehicle. The energy absorber assembly extends from the energy absorber body. The energy absorber assembly also includes arcuate absorber elements configured to deform laterally upon impact in a longitudinal direction of the vehicle. When a vertical force is applied to the structure, the body is configured to inhibit deflection of the structure in a vertical or longitudinal direction.

In variations of the structure of the above paragraph, which may be implemented individually or in any combination: the absorber elements are cantilevered to the energy absorber body; the absorber elements comprise a first set of absorber elements and a second set of absorber elements, the first set of absorber elements are configured to deform in a first lateral direction upon impact in the longitudinal direction and the second set of absorber elements are configured to deform in a second lateral direction opposite the first lateral direction upon impact in the longitudinal direction; the first set of absorber elements comprises inner absorber elements and outer absorber elements, the outer absorber elements have a length greater than a length of the inner absorber elements; the absorber elements comprise inner absorber elements and outer absorber elements, the outer absorber elements have a length greater than a length of the inner absorber elements; the absorber elements are located along a substantial length of the body; the absorber elements have a sinusoidal shape; the energy absorber body comprises hollow cans spaced apart along a length of the energy absorber body, the hollow cans are located below the energy absorber assembly; the energy absorber body comprises at least one internal brace located within each hollow can; the internal brace comprises two internal braces cooperating to form an X shape; the energy absorber body comprises walls between the hollow cans, each wall includes a mounting feature; a vehicle fascia housing the energy absorber body and the energy absorber assembly; and the energy absorber body further comprises an outer wall, the energy absorber assembly extending from the outer wall, a plurality of internal braces located within each hollow can, and a plurality vertical stiffening ribs connecting the hollow cans and the outer wall.

In another form, the present disclosure provides a structure for a vehicle that includes an energy absorber body and an energy absorber assembly. The energy absorber body extends in a transverse direction of the vehicle and is configured to be secured to a main body structure of the vehicle. The energy absorber body also comprises hollow cans spaced apart along a length of the energy absorber body. The energy absorber assembly extends from the energy absorber body. The energy absorber assembly also includes arcuate absorber elements configured to deform laterally upon impact in a longitudinal direction of the vehicle. The energy absorber assembly is located above the hollow cans. When a vertical force is applied to the structure, the body is configured to inhibit deflection of the structure in a vertical or longitudinal direction.

In yet another form, the present disclosure provides a structure for a vehicle that includes an energy absorber body and an energy absorber assembly. The energy absorber body extends in a transverse direction of the vehicle and is configured to be secured to a main body structure of the vehicle. The energy absorber body also comprises hollow cans spaced apart along a length of the energy absorber body and a plurality of internal braces located within each hollow can. The energy absorber assembly is cantilevered to the energy absorber body. The energy absorber assembly also includes arcuate absorber elements configured to deform laterally upon impact in a longitudinal direction of the vehicle. The energy absorber assembly is located above the hollow cans. When a vertical force is applied to the structure, the energy absorber body is configured to inhibit deflection of the structure in a vertical direction. The absorber elements comprise a first set of absorber elements and a second set of absorber elements. The first set of absorber elements are configured to deform in a first lateral direction upon impact in the longitudinal direction and the second set of absorber elements are configured to deform in a second lateral direction opposite the first lateral direction upon impact in the longitudinal direction.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
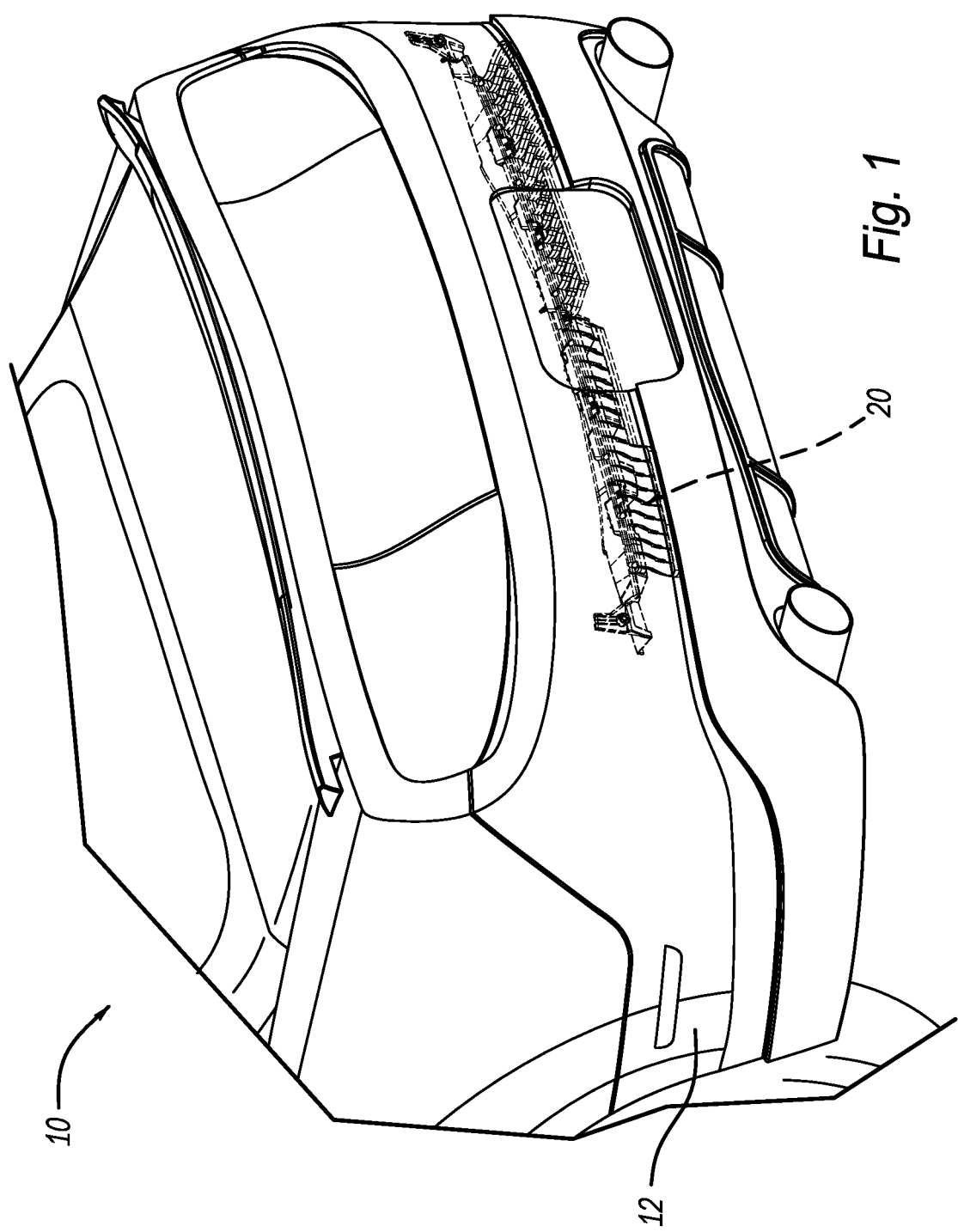
FIG. 1 is a perspective view of a vehicle including an energy absorbing reinforcement structure according to the principles of the present disclosure.
Figure 3:
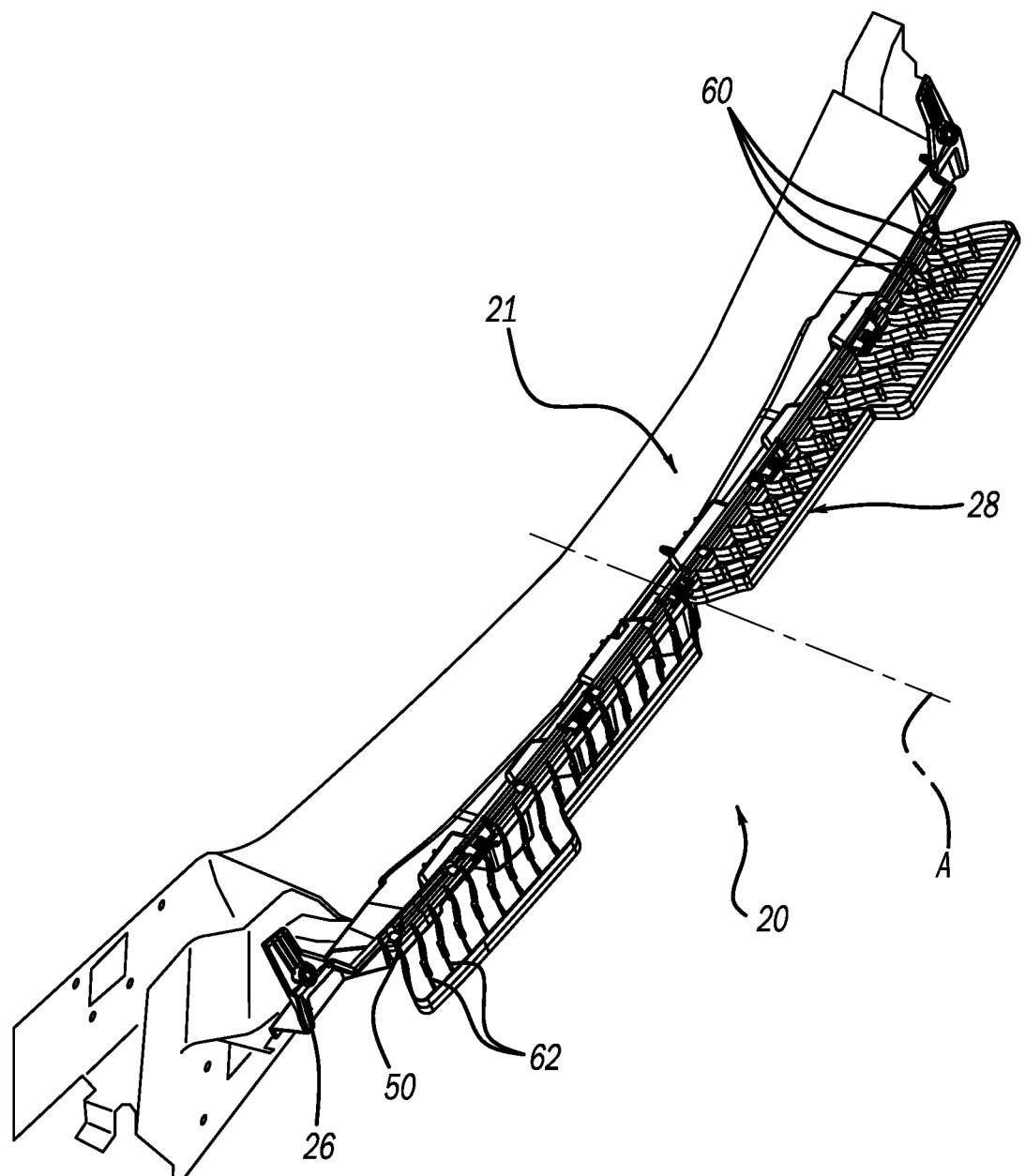
Figure 4:
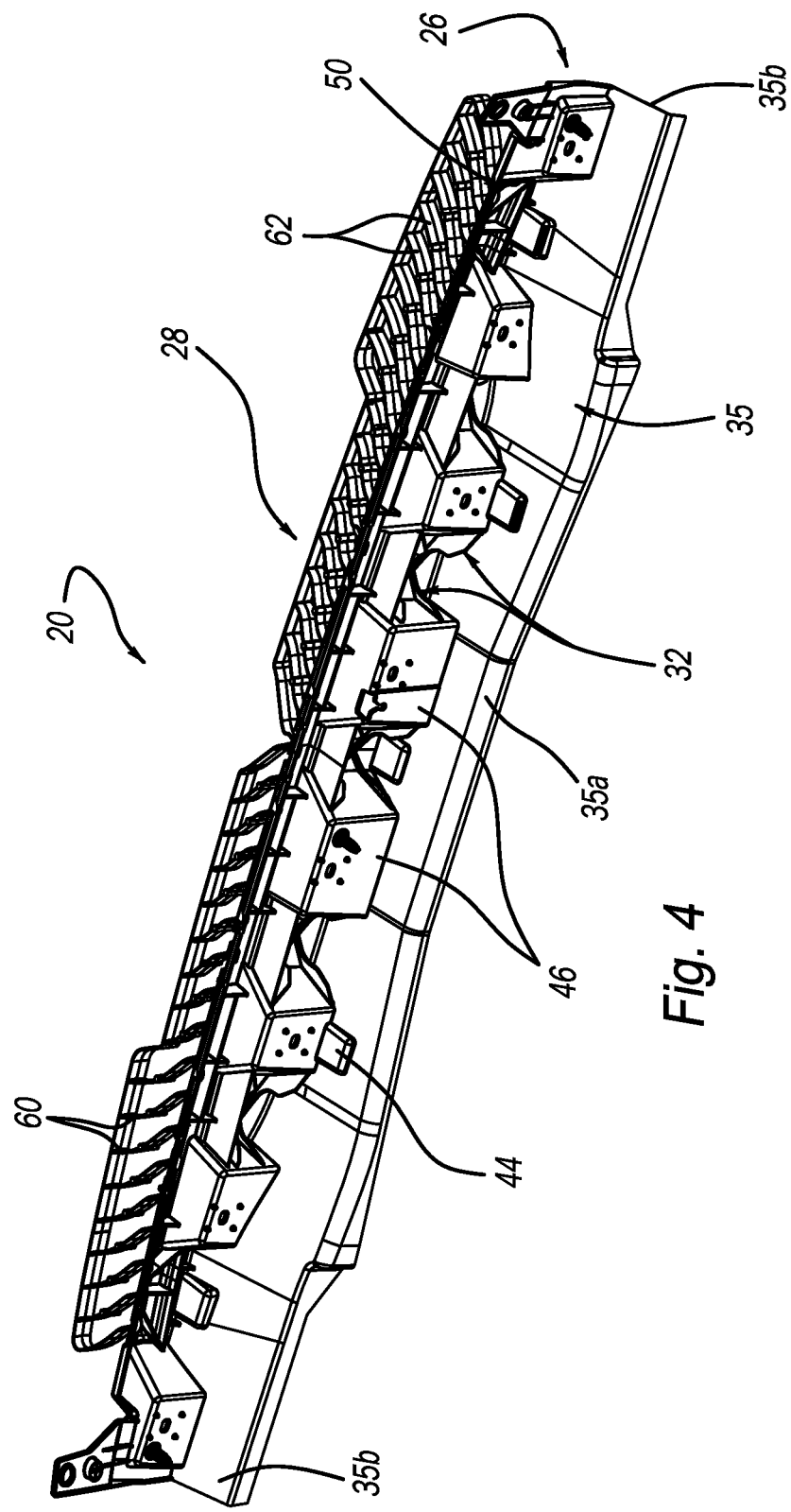
Figure 5:
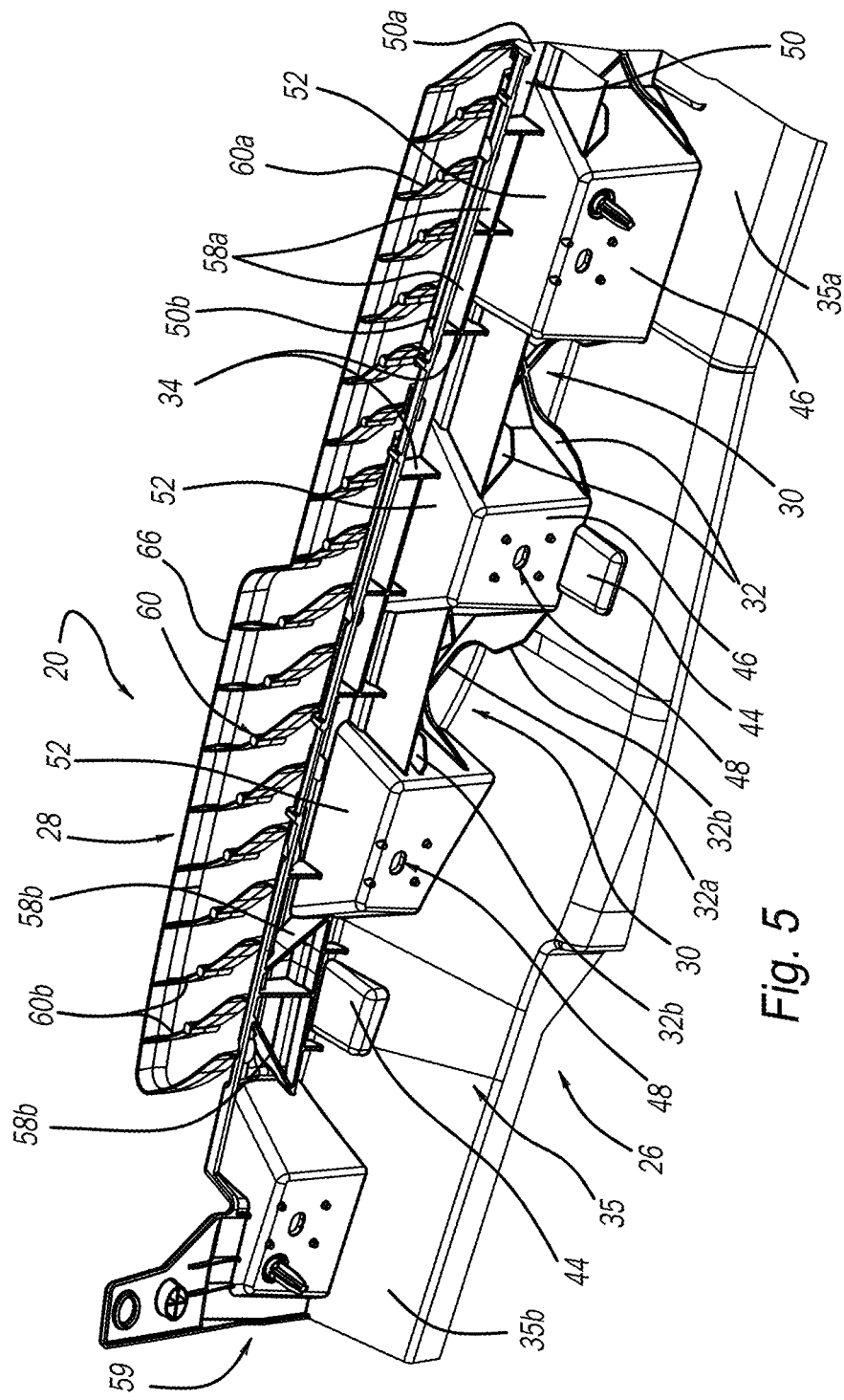
Figure 6:
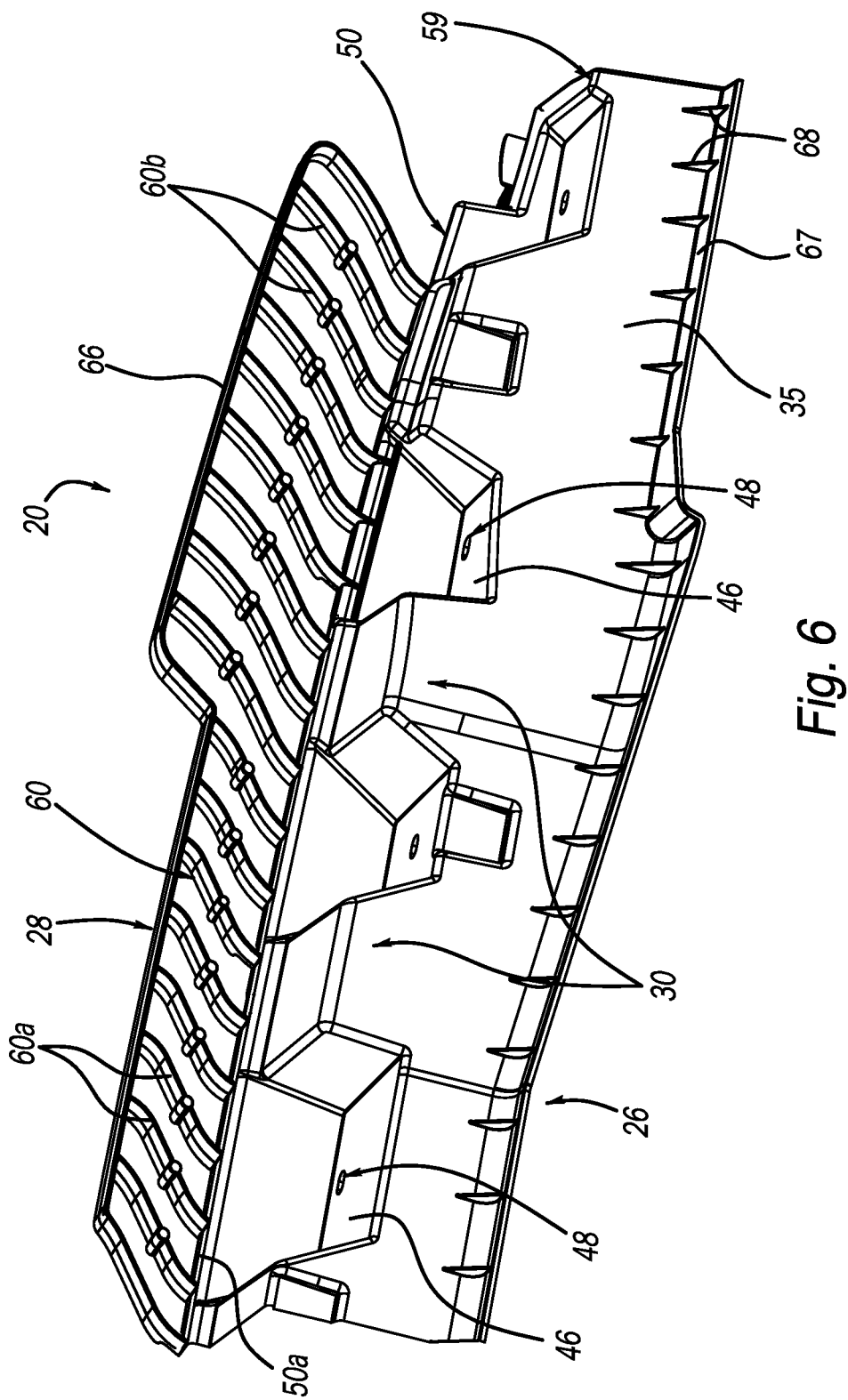
Figure 7:
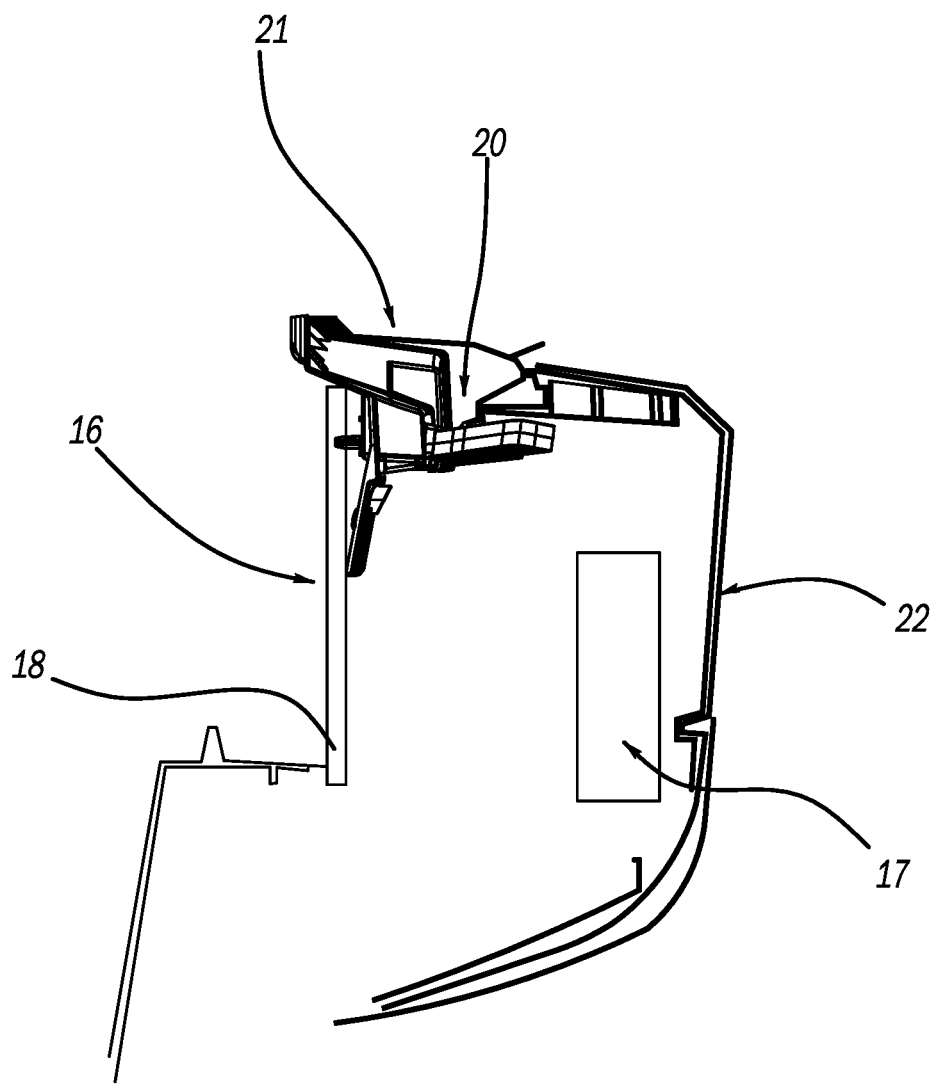
Figure 8:
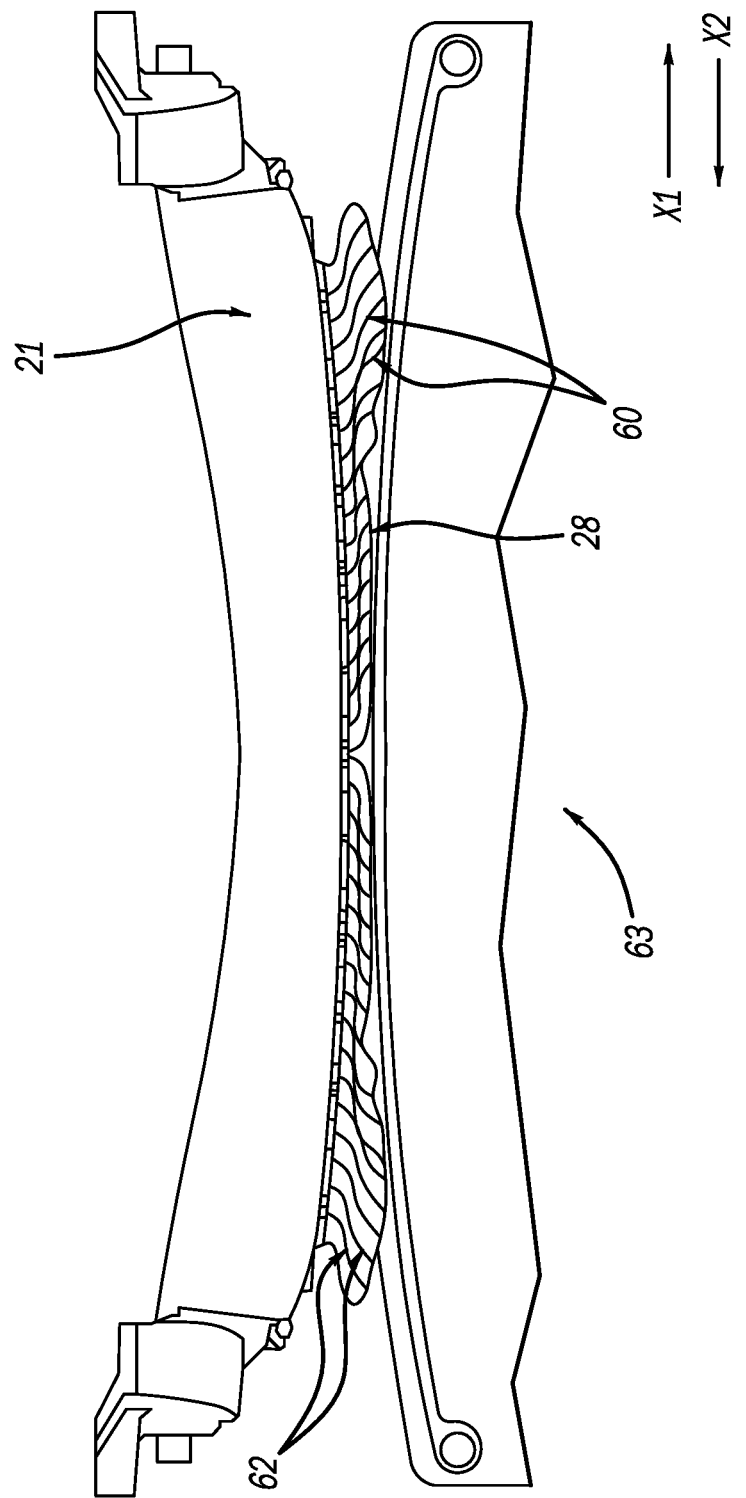

FIG. 3 a top perspective view of the energy absorbing reinforcement structure of FIG. 1 secured to the back panel of the vehicle;

FIG. 4 is a top perspective view of the energy absorbing reinforcement structure of FIG. 1;

FIG. 5 is a perspective view of a portion of the energy absorbing reinforcement structure of FIG. 1;

FIG. 6 is a bottom view of a portion of the energy absorbing reinforcement structure of FIG. 1;

FIG. 7 is a cross-sectional view of a vehicle bumper assembly comprising the energy absorbing reinforcement structure of FIG. 1; and FIG. 8 is a top view of the vehicle bumper assembly after a vehicle impact event.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
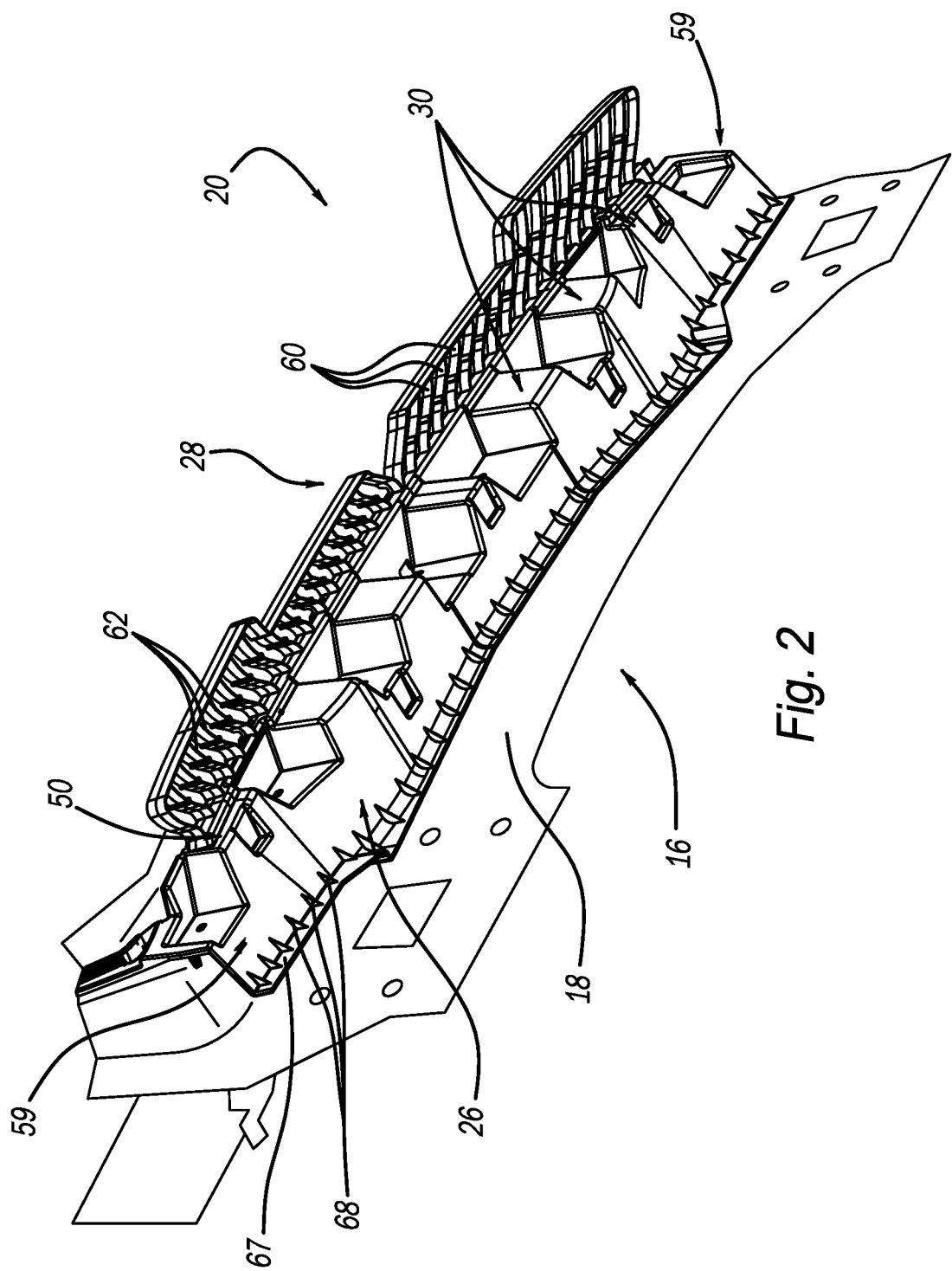
FIG. 2 is a bottom perspective view of the energy absorbing reinforcement structure of FIG. 1 secured to a back panel of the vehicle.

With reference to FIGS. 1 and 2, a vehicle 10 including a vehicle body 12 and a cargo area at a rear end of the vehicle body 12 (i.e., behind an occupancy compartment) is illustrated. One or more doors are rotatably coupled to the vehicle body 12 between a closed position in which access to the cargo area from outside of the vehicle 10 is inhibited, and an open position in which access to the cargo area from outside of the vehicle 10 is allowed. The vehicle body 12 further includes a rear end assembly 16 (FIG. 2) that at least partially defines an opening to the cargo area. The rear end assembly 16 includes a back panel 18 extending in a transverse direction of the vehicle 10. The back panel 18 is generally planar. In some forms, the back panel 18 comprises bends, stiffening ribs and/or double-thick walls providing selected stiffened areas thereof.

With additional reference to FIGS. 3-7, a separate energy absorbing reinforcement structure 20 is secured to the back panel 18 (FIG. 7) of the rear end assembly 16 using mechanical fasteners, for example. A cover panel 21 at least partially defines the opening to the cargo area and extends over a portion of the structure 20 (FIGS. 3 and 7). The structure 20 is made of a plastic material, for example. The structure 20 is also configured to absorb energy and reduce a load in a longitudinal direction of the vehicle 10 upon a vehicle impact event. As shown in FIG. 7, a bumper beam 17 extends in a transverse direction of the vehicle 10 and is located at least partially underneath the structure 20. Crush cans (not shown) extend in a longitudinal direction of the vehicle 10 between the bumper beam 17 and the vehicle frame (not shown), and connect the bumper beam 17 to the vehicle frame. The crush cans are configured to crush to absorb energy. That is, during a vehicle impact, the crush cans are configured to crush, thereby absorbing energy and distributing loads away from the back panel 18 and the vehicle frame. In the example illustrated, a vehicle fascia 22 is secured to the vehicle body 12 and houses at least a portion of the structure 20, at least a portion of the back panel 18, and the bumper beam 17.

With reference to FIGS. 2-7, the structure 20 comprises an energy absorber body 26 and an energy absorber assembly 28. The body 26 is secured to the back panel 18 of the rear end assembly 16 and extends in a transverse direction of the vehicle 10. The body 26 includes hollow cans 30, a plurality of internal braces 32 (FIGS. 4 and 5), and a plurality of stiffening ribs 34 (FIGS. 4 and 5). The hollow cans 30 are spaced-apart from each other along a length of the body 26. Each can 30 extends from a lower wall 35 of the body 26 in a rearward direction. Each can 30 also includes walls (i.e., comprising a pair of side walls, a bottom wall, and an upper wall) extending in a horizontal and/or oblique direction away from the back panel 18 and an end wall closing an end of the can 30. The lower wall 35 and one or more walls of the hollow cans 30 can include ridges 44 formed therein. In this way, the stiffness of the lower wall 35 and the cans 30 are improved. The lower wall 35 also has a generally U-shape where a center portion 35a of the lower wall 35 is positioned lower than end portions 35b of the lower wall 35.

As shown in FIGS. 4 and 5, one or more internal braces 32 are located within a space of each hollow can 30, thereby improving the stiffness of the hollow can 30. In the example illustrated, each internal brace 32 extends diagonally within the space of the hollow can 30 from an upper corner toward a lower corner. In some forms, the internal braces 32 extend vertically and/or horizontally within the space of the hollow can 30. In other forms, one or more of the internal braces 32 extend vertically and one or more of the internal braces 32 extend diagonally within the space of the hollow can 30. In the example illustrated, two internal braces 32 are located within the space of each hollow can 30 and cooperate to form an X shape. The two internal braces 32 are fixed to each other at a middle portion, thereby forming a unitized structure. Each internal brace 32 includes an inner section 32a and outer ends 32b. The outer ends 32b are fixed to a respective wall and include a width that is greater than a width of the inner section 32a. Mounting walls 46 are located between the hollow cans 30 and extend in a vertical direction. The mounting walls 46 include mounting features 48. In the example illustrated, the mounting features 48 comprise one or more apertures. Fasteners (not shown) are configured to extend through the mounting features 48 and the back panel 18, thereby removably securing the structure 20 to the back panel 18.

An outer wall 50 extends from the hollow cans 30 and upper walls 52 of the body 26 and includes a vertical portion 50a and a horizontal portion 50b extending perpendicular to the vertical portion 50a. The horizontal portion 50b extends toward the back panel 18 at least partially over the hollow cans 30, the upper walls 52 and the lower wall 35. With reference to FIGS. 4 and 5, the stiffening ribs 34 extend vertically and are fixed to the outer wall 50, the upper walls 52, and the hollow cans 30. That is, some of the stiffening ribs 34 are fixed to the outer wall 50 and the upper wall of the hollow cans 30, and some of the stiffening ribs 34 are fixed to the outer wall 50 and the upper walls 52. In this way, the stiffening ribs 34, the hollow cans 30, the internal braces 32, the mounting walls 46, and the lower wall 35 cooperate to inhibit deflection of the body 26 in a vertical direction when a vertical force is applied to the structure 20. In one example, the vertical force comprises a person stepping on the vehicle fascia 22, for example. In the example illustrated, reinforcement beams 58a extend in a transverse direction of the vehicle 10 and connect two or more of the stiffening ribs 34 to each other. One or more reinforcement beams 58b extend diagonally and are fixed to the outer wall 50 and a respective upper wall 52. In the example illustrated, the reinforcement beams 58b are located at respective ends 59 of the structure 20.

With reference to FIGS. 2-7, the energy absorber assembly 28 extends from the vertical portion 50a of the outer wall 50 in a rearward direction such that the energy absorber assembly 28 extends further in the rearward direction than the body 26. In the example illustrated, the energy absorber assembly 28 also extends further in the rearward direction than the bumper beam 17. In some forms, the bumper beam 17 extends further in the rearward direction than the energy absorber assembly 28. The energy absorber assembly 28 is located above the bumper beam 17 and the hollow cans 30 and includes arcuate absorber elements 60, 62 located along a substantial length of the body 26. The absorber elements 60, 62 are configured to deform laterally upon a vehicle impact in a longitudinal direction, thereby absorbing energy and distributing loads away from the back panel 18 and the vehicle frame.

In the example illustrated, the absorber elements 60, 62 are cantilevered to the vertical portion 50a of the outer wall 50 and have a sinusoidal shape. In the example illustrated, the absorber elements 60, 62 have a substantially thin profile with a cylindrical central portion. In some forms, the absorber elements 60, 62 have a thin, uniform profile. As shown in FIG. 8, the absorber elements 60 are configured to deform in a first lateral direction X1 upon a vehicle impact event with a barrier 63 and the absorber elements 62 are configured to deform in a second lateral direction X2 opposite the first lateral direction X1 upon the vehicle impact event with the barrier 63. With reference to FIG. 5, the absorber elements 60 comprise inner absorber elements 60a and outer absorber elements 60b. The inner absorber element 60a are located at or near a center axis A of the vehicle 10 and the outer absorber elements 60b are located at or near a respective end 59 of the structure 20.

In the example illustrated, the outer absorber elements 60b have a length that is greater than a length of the inner absorber elements 60a. In some forms, the inner absorber elements 60a have a length that is greater than a length of the outer absorber elements 60b. The absorber elements 60a, 60b comprise a first end fixed to the vertical portion 50a of the outer wall 50 and a second end fixed to an outer connecting member 66 extending in a transverse direction of the vehicle 10. In this way, the absorber elements 60 and the connecting member 66 form a unitized structure located on a side of the center axis A of the vehicle 10. The absorber elements 60 are orientated to facilitate deformation in the first lateral direction X1. That is, the absorber elements 60 extend laterally in the first lateral direction X1 as the absorber elements 60 extend from the first end toward the second end.

The structure and function of the absorber elements 62 are similar to absorber elements 60 described above, and therefore, will not be described again in detail. As shown in FIGS. 2 and 6, a flange 67 extends downward from an end of the lower wall 35 and abuts against the back panel 18. Braces 68 are fixed to the flange 67 and the lower wall 35, thereby improving the stiffness of the body 26. Although the structure 20 is shown and described secured to the back panel 18 of the rear end assembly 16, the structure 20 can be secured to a panel of a front end assembly (not shown) of the vehicle 10 without departing from the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structure for a vehicle, the structure comprising:
a body extending in a transverse direction of the vehicle and configured to be secured to a main body structure of the vehicle; and
an energy absorber assembly extending from the body, the energy absorber assembly comprising a connecting member and arcuate absorber elements configured to deform laterally upon impact in a longitudinal direction of the vehicle, each arcuate absorber element including a proximal end extending from the body and a distal end, the connecting member coupled to the distal ends of the arcuate absorber elements,
wherein, when a vertical force is applied to the structure, the body is configured to inhibit deflection of the structure in a vertical direction.

2. The structure of claim 1, wherein the absorber elements are cantilevered to the body.

3. The structure of claim 1, wherein the absorber elements comprise a first set of absorber elements and a second set of absorber elements, and wherein the first set of absorber elements are configured to deform in a first lateral direction upon impact in the longitudinal direction and the second set of absorber elements are configured to deform in a second lateral direction opposite the first lateral direction upon impact in the longitudinal direction.

4. The structure of claim 3, wherein the first set of absorber elements comprises inner absorber elements and outer absorber elements, and wherein the outer absorber elements have a length greater than a length of the inner absorber elements.

5. The structure of claim 1, wherein the absorber elements comprise inner absorber elements and outer absorber elements, and wherein the outer absorber elements have a length greater than a length of the inner absorber elements.

6. The structure of claim 1, wherein the absorber elements are located along a substantial length of the body.

7. The structure of claim 1, wherein the absorber elements have a sinusoidal shape.

8. The structure of claim 1, wherein the body comprises hollow cans spaced apart along a length of the body, the hollow cans located below the energy absorber assembly.

9. The structure of claim 8, wherein the body comprises at least one internal brace located within each hollow can.

10. The structure of claim 9, wherein the at least one internal brace comprises two internal braces cooperating to form an X shape.

11. The structure of claim 9, wherein the body comprises walls between the hollow cans, and wherein each wall includes a mounting feature.

12. The structure of claim 1, further comprising a vehicle fascia housing the body and the energy absorber assembly.

13. A structure for a vehicle, the structure comprising:
a body configured to be secured to a main body structure of the vehicle and extending in a transverse direction of the vehicle, the body comprising hollow cans spaced apart along a length of the body; and an energy absorber assembly extending from the body and comprising arcuate absorber elements configured to deform laterally upon impact in a longitudinal direction of the vehicle, the energy absorber assembly located above the hollow cans, wherein, when a vertical force is applied to the structure, the body is configured to inhibit deflection of the structure in a vertical direction.

14. The structure of claim 13, wherein the absorber elements comprise a first set of absorber elements and a second set of absorber elements, and wherein the first set of absorber elements are configured to deform in a first lateral direction upon impact in the longitudinal direction and the second set of absorber elements are configured to deform in a second lateral direction opposite the first lateral direction upon impact in the longitudinal direction.

15. The structure of claim 14, wherein the first set of absorber elements comprises inner absorber elements and outer absorber elements, and wherein the outer absorber elements have a length greater than a length of the inner absorber elements.

16. The structure of claim 13, wherein the absorber elements have a sinusoidal shape.

17. The structure of claim 13, wherein the body comprises at least one internal brace located within each hollow can.

18. The structure of claim 13, wherein the body further includes:

an outer wall, the energy absorber assembly extending from the outer wall;

a plurality of internal braces located within each hollow can; and a plurality vertical stiffening ribs connecting the hollow cans and the outer wall.

19. The structure of claim 13, wherein the body comprises walls between the hollow cans, and wherein each wall includes a mounting feature.

20. A structure for a vehicle, the structure comprising:

a body configured to be secured to a main body structure of the vehicle and extending in a transverse direction of the vehicle, the body comprising hollow cans spaced apart along a length of the body and a plurality of internal braces located within each hollow can; and an energy absorber assembly cantilevered to the body and comprising a plurality of absorber elements configured to deform laterally upon impact in a longitudinal direction of the vehicle, the energy absorber assembly located above the hollow cans, wherein, when a vertical force is applied to the structure, the body is configured to inhibit deflection of the structure in a vertical direction, and wherein the absorber elements comprise a first set of absorber elements and a second set of absorber elements, the first set of absorber elements are configured to deform in a first lateral direction upon impact in the longitudinal direction and the second set of absorber elements are configured to deform in a second lateral direction opposite the first lateral direction upon impact in the longitudinal direction.

* * * * *